July 25, 1939.  B. R. PURVIN  2,167,267
HOBBING MACHINE
Filed April 23, 1936     5 Sheets-Sheet 3

INVENTOR
Benjamin R. Purvin
BY
Parker, Carlson, Pfund & Hubbard
ATTORNEYS

July 25, 1939.   B. R. PURVIN   2,167,267
HOBBING MACHINE
Filed April 23, 1936   5 Sheets-Sheet 4

INVENTOR
Benjamin R. Purvin
BY
Parker, Carlson, Pitney & Hubbard
ATTORNEYS

July 25, 1939.  B. R. PURVIN  2,167,267
HOBBING MACHINE
Filed April 23, 1936    5 Sheets-Sheet 5

INVENTOR
Benjamin R. Purvin
BY
Parker, Carlson, Pitner & Hubbard
ATTORNEYS

Patented July 25, 1939

2,167,267

UNITED STATES PATENT OFFICE 2,167,267

HOBBING MACHINE

Benjamin R. Purvin, Rockford, Ill., assignor to Barber-Colman Company, Rockford, Ill., a corporation of Illinois Application April 23, 1936, Serial No. 75,949

8 Claims. (Cl. 90—4)

The present invention relates to improvements in variable speed feeding mechanisms for machine tools, and has particular reference to a new and improved mechanism for effecting a relative translatory feed between a work spindle and a tool spindle rotatable in timed relation, as for example in hobbing machines.

One of the objects of the invention resides in the provision of a novel variable speed feeding mechanism for hobbing machines which is adjustable to vary the rate of feed without the use of change gears.

Another object is to provide a mechanism of the foregoing character which is readily adaptable for the cutting of either spur or helical gears.

A further object resides in the provision of a new and improved feeding mechanism for hobbing machines which is flexible in character, and adjustable to vary the rate of feed in finely graduated increments over the entire range.

Still another object resides in the provision, in a machine for hobbing helical gears or the like wherein the timed rotation of the spindles is adjusted in accordance with the relative axial feed to compensate for the lead of the gear teeth, of a novel feeding mechanism which not only is adjustable to vary the rate of feed over a finely graduated range, but which also maintains an accurate and positive timed relation between the compensatory adjustment and the feed in all positions of feed adjustment.

Further objects and advantages will become apparent as the description proceeds.

In the accompanying drawings.

Figure 1:
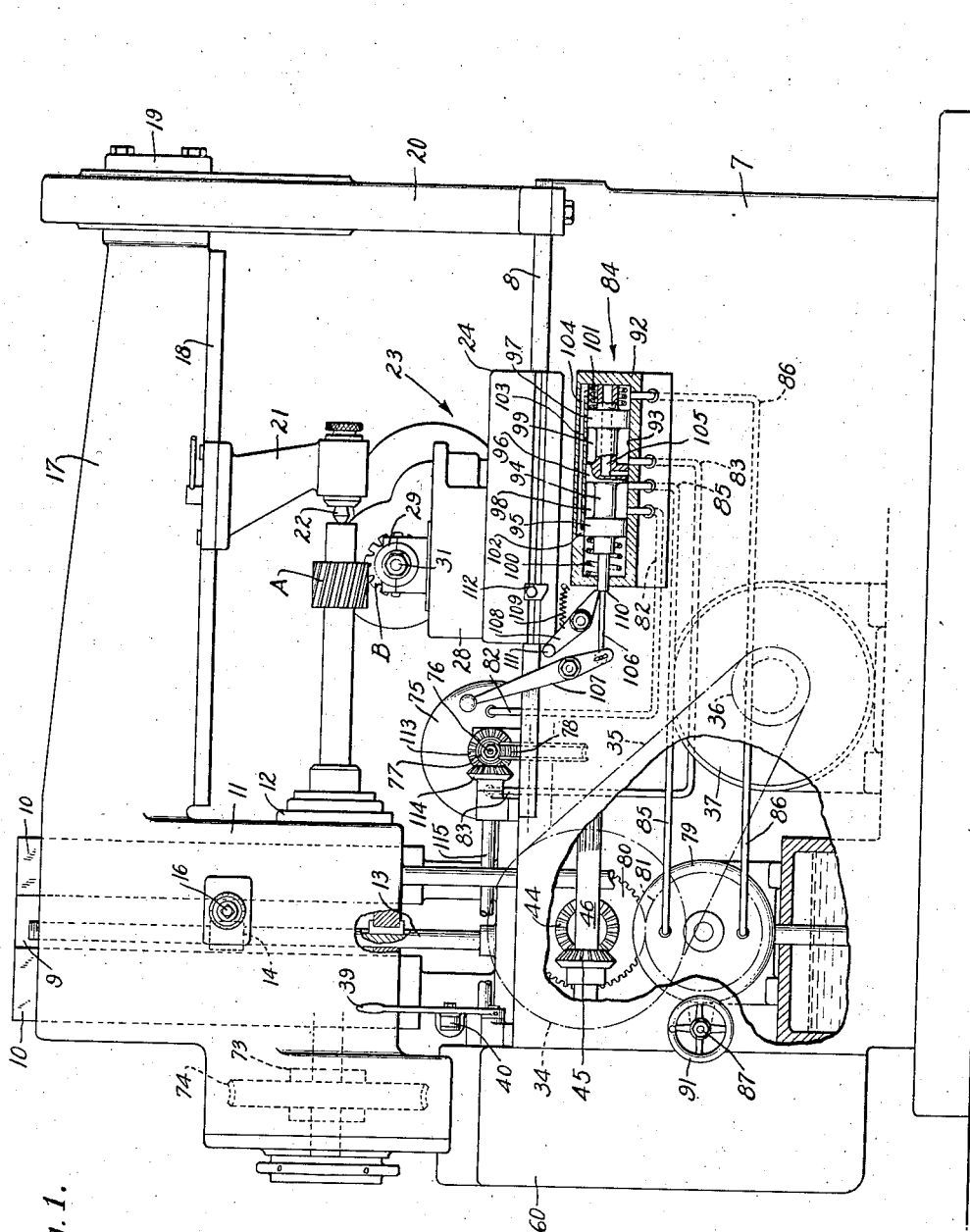
Fig. 1 is a front elevational view, partially in section and partially broken away, of a hobbing machine with a feeding mechanism embodying the features of my invention.
Figure 2:
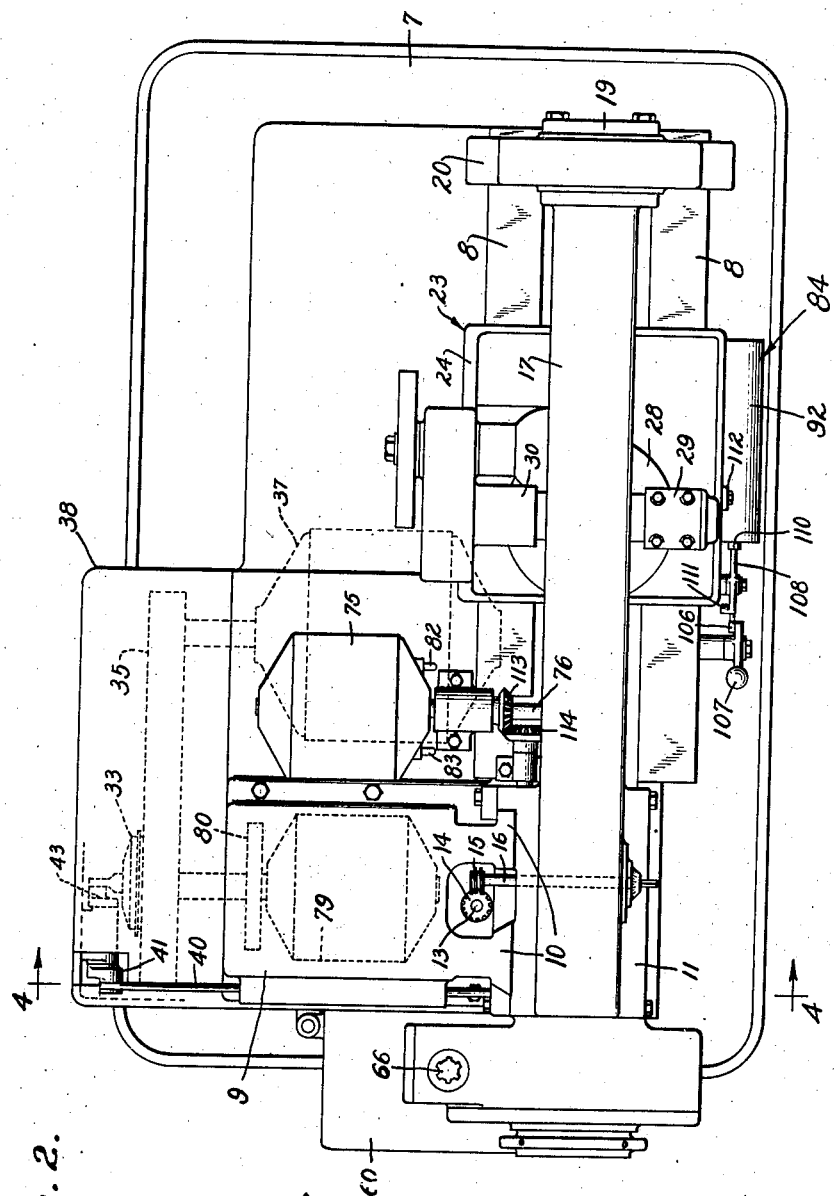
Fig. 2 is a plan view of the machine.
Figure 3:
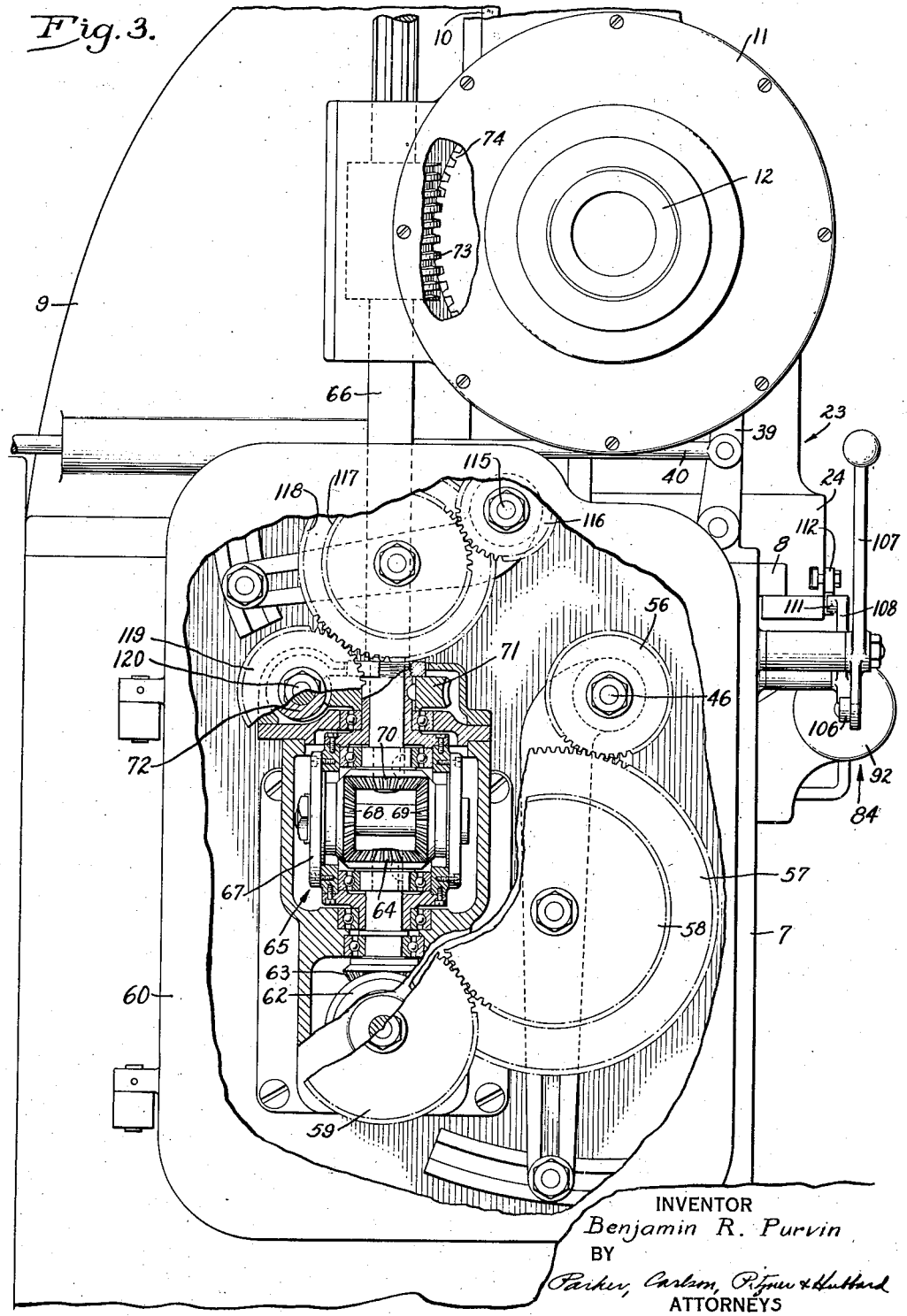
Fig. 3 is a fragmentary left end view on an enlarged scale and partially sectioned.
Figure 4:
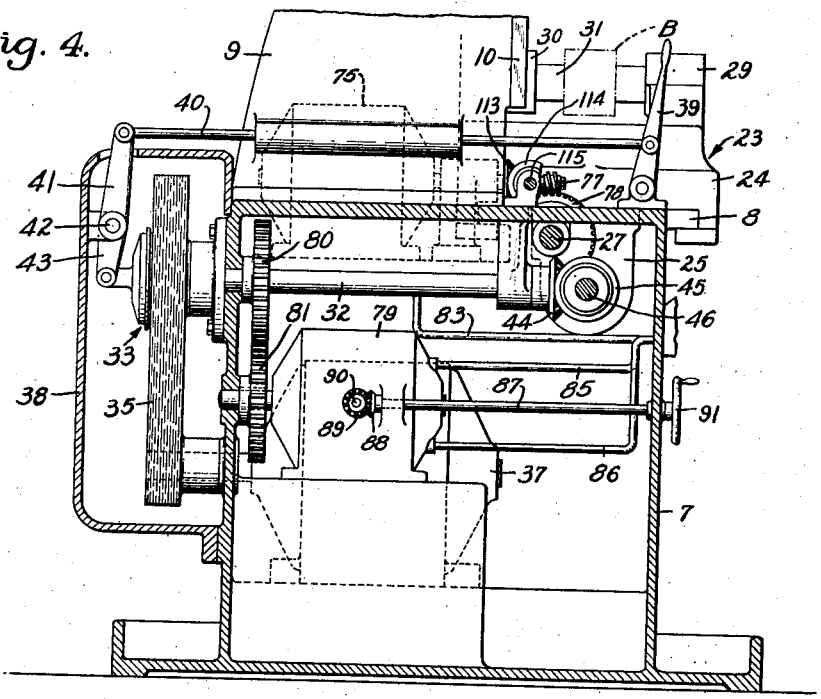
Fig. 4 is a fragmentary transverse sectional view taken substantially along line 4—4 of Fig. 2.
Figure 5:
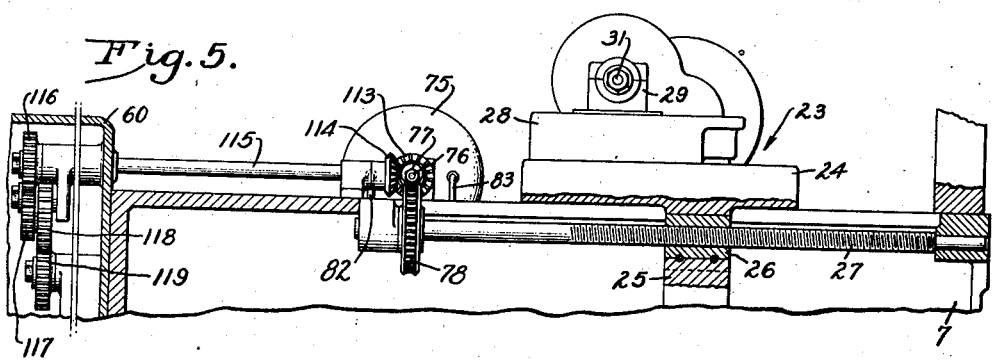
Fig. 5 is a fragmentary longitudinal sectional view of the machine.
Figure 6:
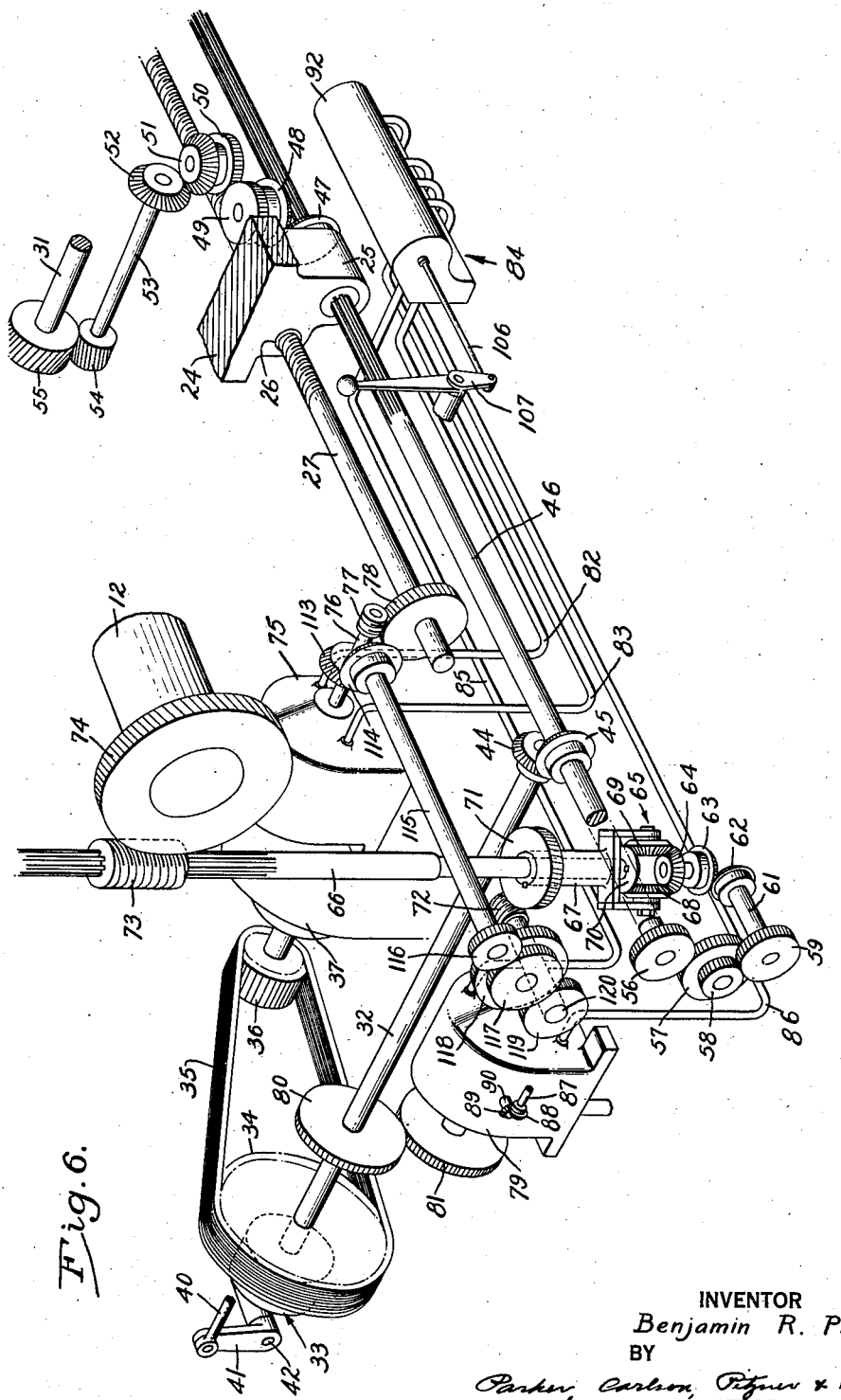
Fig. 6 is a diagrammatic representation of the various power rotative and feed drives.

Referring more particularly to the drawings, the feeding mechanism constituting the preferred embodiment of the invention is shown incorporated in a hobbing machine comprising an elongated base 7 with longitudinal ways 8 on the top. An upright column 9, with parallel vertical ways 10 on the front, is fixed on one end of the base 7. Slidably mounted on the ways 10 for vertical adjustment is a headstock 11 rotatably supporting a horizontal spindle 12 extending longitudinally of the ways 8. In the present instance, the means for adjusting the headstock 11 comprises a non-rotatable vertical screw 13, with the lower end engaged against a stop on the base 7, and in threaded engagement intermediate its ends with a nut 14 rotatably mounted on the rear of the headstock. The nut is in the form of a worm wheel meshing with a worm 15 on a shaft 16 journaled in and extending to the front of the headstock 11 for manual actuation.

The headstock 11 is rigid with an elongated over arm 17 which extends longitudinally over the base 7, and which has parallel longitudinal ways 18 on the underside. The free end of the over arm 17 is rigidly attached to a block 19 vertically adjustable in an end support 20 adjustably mounted on the ways 8. A tailstock 21 having a center 22 in axial alignment with the spindle 12 is mounted on the ways 18 for adjustment along the arm 17.

Preferably, the spindle 12 is employed to support and rotate the work, which is herein disclosed as a spiral gear blank A mounted on an arbor clamped in the spindle and against the center 22.

Mounted for power translation on the ways 8 between the column 9 and the end support 20 is a tool support 23 comprising a saddle 24 directly engaging the ways and having a depending lug 25 in which a fixed nut 26 is secured. A screw 27, in threaded engagement with the nut 26, is journaled at its ends in the base 7, and is adapted to be driven from a suitable source of power to translate the saddle 24. A hob swivel 28 is mounted on the saddle 24 for angular adjustment about a vertical axis, and has two upstanding bearings 29 and 30 in which a tool spindle 31 is journaled. The spindle 31 extends diametrically across the swivel axis, and supports a suitable hob B for cutting the gear A.

The work and hob spindles 12 and 31 are rotated in timed relation from a main drive shaft 32 journaled in and extending to the rear of the base 7. Rotatable on the shaft 32 and adapted to be connected thereto by a clutch 33 is a pulley 34. A belt 35 serves to connect the pulley 34 to a pulley 36 on the shaft of an electric drive motor 37 within the base 7. The belt drive is suitably enclosed by a housing 38 on the rear of the base 7.

The clutch 33 is adapted to be opened and closed by means of a manual lever 39 operable from the front of the base 7. In the present instance, the lever 39 is connected through a rod 40 to a crank arm 41 on a rock shaft 42 journaled in the housing 38. A second crank arm 43 on the shaft 42 is adapted to operate the clutch 33.

Operatively connected to the main drive shaft 32 through meshing bevel gears 44 and 45 is a shaft 46 journaled in and extending longitudinally through the base 7. One end of the shaft 46 is splined and extends slidably through the hub of a bevel gear 47 rotatably mounted in the lug 25 on the underside of the saddle 24. The gear 47 is connected through a train of gears 48 to 52 to a shaft 53 which is journaled in the swivel 28, and which is connected through gears 54 and 55 to the hob spindle 31. The gear 52 is arranged to roll about the gear 51 so that the rotative drive for the hob spindle 31 is connected in all angular positions of the hob swivel 28.

The rotative drive for the work spindle 12 is taken from the shaft 46 through a train of index change gears 56 to 59 mounted in a gear housing 60 on the left end of the base 7, and driving a shaft 61. The latter, through bevel gears 62 and 63, is connected to the inlet bevel gear 64 of a differential mechanism 65 driving a vertical spline shaft 66 suitably journaled in the base 7 and column 9. This differential mechanism comprises a cage 67 rotatable on the shaft 66 and carrying two bevel gears 68 and 69 both meshing with the gear 64 and a bevel gear 70 on the shaft. A worm wheel 71 rigid with the cage 67 and coaxial with the shaft 66 meshes with a worm 72. When the cage 67 is held stationary, the shaft 66 will rotate in timed relation to the shaft 46 as determined by the index change gears 56 to 59. Rotation of the worm wheel 71 will advance or retard the timed rotation of the shaft 66 relative to the shaft 46.

Splined for vertical movement on the shaft 66 is a worm 73 suitably journaled in and adjustable with the headstock 11. The worm 73 meshes with a worm wheel 74 to complete the drive for the work spindle 12.

One of the primary features of the present invention resides in the provision of a variable speed mechanism, avoiding the use of change gears, for effecting a cutting feed between a work piece and a tool rotating in timed relation, and in the instance herein disclosed for rotating the screw 27 to feed the hob B axially of the spindle 12 through the gear blank A. The variable speed mechanism is adjustable over a finely graduated range from zero to maximum, and hence may be either electrical or hydraulic in character. Preferably, an hydraulic transmission is employed, comprising a rotary hydraulic motor 75 having a shaft 76 connected through a worm 77 and worm wheel 78 to the screw 27. A variable displacement pump 79, driven from the shaft 32 through gears 80 and 81 at a constant speed, is adapted to be reversibly connected to the motor 75 in a closed hydraulic circuit. The details of the motor 75 and the pump 79, per se, form no part of the present invention, and hence are not disclosed herein. The motor 75 has two fluid transmission conduits, passages or lines 82 and 83 which are adapted to be reversibly connected by a direction and control valve 84 to discharge and return lines 85 and 86 leading respectively from and to the pump 79. The displacement of the pump 79, and hence the speed of the motor 75, is adjustable through a shaft 87, bevel gears 88 and 89 and a shaft 90 by a hand wheel 91 from the front of the base 7.

The direction valve 84 comprises a casing 92 mounted on the front of the base 7, and formed with a closed bore 93. A spool plunger 94 is disposed for axial adjustment in the bore 93. The plunger 94 is formed with three longitudinally spaced peripheral heads 95, 96 and 97 defining intermediate spaces 98 and 99. Two coiled compression springs 100 and 101 interposed between the ends of the bore 93 and the heads 95 and 97 tend to move the plunger into central or neutral position.

The lines 85 and 86 from the pump 79 open to the bore 93 respectively midway between the ends and at one end. The lines 82 and 83, from the motor 75, open to the bore 93 respectively at opposite sides of the line 85, and are spaced from the line 85 by the width of the head 96 and adapted for selective connection therewith respectively through the spaces 98 and 99 upon movement of the plunger 94 into its opposite end positions. The lines 85 and 86, in the reverse positions of the plunger 94, are also adapted respectively for selective connection through the spaces 98 and 99 with two longitudinally spaced ports 102 and 103 which are controlled by the heads 95 and 97, and which open to a passage 104 in constant communication with the return line 86. An axial bore 105 in the plunger 94 communicates at its outer end through the bore 93 with the return line 86, and opens at its inner end to the periphery of the head 96 for registration with the line 85 when the plunger 94 is in neutral position.

The arrangement of lines and ports is such that when the plunger 94 is in the right-hand position, fluid from the pump 79 will pass through the line 85, the space 98 and the line 82 to the motor 75, and from the motor through the line 83, the annular space 99, the port 103, the passage 104 and the line 86 to the pump to effect a feed of the saddle 24 in one direction, for example to the left in a cutting stroke. When the valve plunger 94 is in the left-hand position, the supply of fluid under pressure to the motor 75 is reversed to reverse the direction of feed of the saddle. In this position of adjustment, fluid from the pump 79 passes through the line 85, the space 99 and the line 83 to the motor 75, and from the motor through the line 82, the space 98, the port 102, the passage 104, and the return line 86 to the pump. When the valve plunger 94 is in neutral position, the pump is disconnected from the motor, the fluid passing from the line 85, through the bore 105 to the return line 86, and the lines 82 and 83 being disconnected both from pressure and exhaust.

To provide means for operating the valve 84, one end of the plunger 94 is rigidly connected to an axial rod 106 which extends from the casing 92 for connection to the lower end of a lever 107 pivoted intermediate its ends on the base 7. The plunger 94 is held releasably in the right-hand position, to effect the cutting feed, by a latch 108 which is pivoted on the base 7, and which is urged by a tension spring 109 into position for engagement at one end by a shoulder 110 on the rod 106. A pin 111 on the other end of the latch 108 is disposed in the path of a dog 112 adjustably mounted on the saddle 24. At the end of the cutting stroke, the dog 112 will depress the pin 111 to disengage the latch 108 from the shoulder 110, and thereupon the spring 101 will move the plunger 94 into neutral position to stop the feed. The return movement of the saddle 24 is effected by moving the operating lever 107 to the right.

When work elements with teeth or keys parallel to the axis, such for example as spur gears are to be cut, the work and tool spindles 12 and 31 are rotated in timed relation, and the relationship need not be adjusted in the course of the feed. However, for cutting work pieces, such as the helical gear A, having teeth or projections with a lead, the rotation of the work and tool spindles 12 and 31 must be relatively adjusted to compensate for the lead as the feed proceeds. This compensation is effected by driving the differential mechanism 65 in timed relation to the feed. In the present instance, the drive is taken from the shaft 76 which is connected through bevel gears 113 and 114 to a shaft 115 journaled in the base 7. The shaft 115 is connected through lead change gears 116 to 119 to a shaft 120 on which the worm 72 is mounted. Different gears 116 to 119 may be substituted for different leads. If the work has no lead, the gears are removed to interrupt the drive to the differential mechanism.

I claim as my invention:

1. A hobbing machine comprising, in combination, a work spindle, a tool spindle, means for rotating said spindles in timed relation and including a differential mechanism for adjusting said relation, a mechanical drive for feeding said tool spindle axially of said work spindle, a mechanical drive for said mechanism, a hydraulic motor for operating said drives in timed relation, a variable displacement pump, a direction valve for connecting said motor and said pump reversibly in a closed circuit and having a neutral position for short-circuiting said pump, spring means tending to urge said valve out of either operative position into neutral position, an operator for said valve, means for retaining said valve releasably in one operative position, and means for tripping said last mentioned means to release said valve for movement into neutral position upon movement of said tool spindle into a predetermined feed position.

2. A hobbing machine comprising, in combination, a work spindle, a tool spindle, means for rotating said spindles in timed relation, a mechanical drive for feeding said tool spindle axially of said work spindle, a reversible hydraulic motor for operating said drive, a variable displacement pump, a direction valve for connecting said motor and said pump reversibly in a closed circuit and having a neutral position for short-circuiting said pump, spring means tending to urge said valve out of either operative position into neutral position, an operator for said valve, means for retaining said valve releasably in one operative position, and means for tripping said last mentioned means to release said valve for movement into neutral position upon movement of said tool spindle into a predetermined feed position.

3. A hobbing machine comprising, in combination, a work spindle, a tool spindle, means for rotating said spindles in timed relation, a mechanical drive for feeding said tool spindle axially of said work spindle, a reversible hydraulic motor for operating said drive, a variable displacement constant speed pump, a direction valve for connecting said motor and said pump reversibly in a closed circuit and having a stop position, and means automatically operable in response to movement of said tool spindle in one direction into a predetermined position to effect movement of said valve into said stop position.

4. A hobbing machine comprising, in combination, a base, a column on one end of said base, an end support on the other end of said base, a headstock vertically slidable on said column and having an over arm integral therewith and slidable on said end support, a horizontal work spindle rotatable in said headstock, a tool slide mounted on said base for movement axially of said work spindle, a tool spindle rotatably mounted on said tool slide, means for rotating said spindles in timed relation, mechanical means for moving said tool slide to relatively feed said tool spindle axially of said work spindle, and a variable speed hydraulic transmission for operating said mechanical means, said transmission including a hydraulic motor, means for supplying pressure fluid in variable amounts over a finely graduated range from zero to maximum, and valve means for operatively connecting said motor to said last mentioned means.

5. A hobbing machine comprising, in combination, a work spindle, a tool spindle, means for rotating said spindles in timed relation and including a differential mechanism for adjusting said relation, a mechanical drive for feeding said tool spindle axially of said work spindle, a mechanical drive for said mechanism, a hydraulic motor for operating said drives in timed relation, a variable displacement pump, and a direction valve for connecting said motor and said pump reversibly in a closed circuit.

6. A hobbing machine comprising, in combination, a work spindle, a tool spindle, means for rotating said spindles in timed relation, a mechanical drive for relatively feeding said tool spindle axially of said work spindle, a hydraulic motor for operating said drive, a pump, a direction valve for connecting said pump reversibly to said motor and having a neutral position in which said connection is interrupted, spring means tending to urge said valve out of either operative position into neutral position, an operator for said valve, means for retaining said valve releasably in one operative position, and means for tripping said last mentioned means to release said valve for movement into neutral position upon movement of said tool spindle into a predetermined feed position.

7. A hobbing machine comprising, in combination, a work spindle, a hob spindle, means for rotating said spindles in a normal timed relation to maintain the work and the hob in proper meshing engagement, means for feeding said spindles relatively to each other in a direction axially of said work spindle, and a hydraulic transmission for driving said last mentioned means, said hydraulic transmission being available at will for modifying the timed relation of said spindles in definite timed relation to the relative feed of said spindles whereby to compensate for the inclination of the gear teeth when hobbing gears with a tooth lead.

8. A hobbing machine comprising, in combination, a work spindle, a tool spindle, means for rotating said spindles in positive timed relation, a mechanical drive without change gears for feeding said spindles relatively to each other, mechanical means available at will for adjusting the rotative phase relation between said spindles, a reversible hydraulic motor for operating said drive and said mechanical means in positive timed relation, a variable delivery pump, and control means for operatively connecting said pump reversibly to said motor.

BENJAMIN R. PURVIN.